United States Patent Office 2,734,314
Patented Feb. 14, 1956

2,734,314

TREATMENT OF PSOROSIS, COMMONLY CALLED "SCALY BARK DISEASE"

Grace A. MacKay, Upland, Calif.

No Drawing. Application December 11, 1952,
Serial No. 325,452

8 Claims. (Cl. 47—58)

This invention relates to treatment of psorosis, commonly called "scaly bark disease," and it comprises a method which when properly applied effects a cure or at least eliminates all symptoms of psorosis which is one of the most deadly of all citrus tree diseases; said method comprising applying directly to the affected areas of trees afflicted with psorosis a dilute solution or emulsion of iodine in a non-toxic vehicle; the concentration of iodine and the amount applied being sufficient to penetrate the outer bark without injuring and preferably not reaching the inner cambium layer of delicate formation cells lying between the bark and the wood from which these cells are built up; the concentration of iodine in the vehicle usually ranging from about 0.1 to 1% by weight of iodine, depending upon the manner in which it is applied; the solution advantageously containing an alkali metal iodide and/or organic solvent for iodine in amounts sufficient to dissolve the iodine present; all as more fully hereinafter set forth and as claimed.

Psorosis or scaly bark disease has been known and recognized for a period of at least 300 years. Citrus trees are particularly susceptible to this disease. The first symptom of this disease is the appearance of scaly patches of bark on the trunk and/or branches of the tree. These patches gradually increase in size and penetration and eventually the tree dies, although this may take 10 years or longer. But shortly after the first appearance of the disease the yield of fruit begins to decrease and within a few years the yield drops to the point where the tree is no longer profitably productive. The disease works from the outside in and appears to be a bark disease rather than being systemic. Other diseases such as brown rot and mal di gomma, first affect the upper portions of the main roots and the lower portion of the trunk, from which points the disease spreads in all directions.

At the present time there is no recognized cure for psorosis. The usual recommendation of citriculturalists is to remove and destroy badly infected trees. It is also said that some help can be given by scraping off the scaly bark lightly with a knife just down to the green part and for a short distance around the scaly patches. But scraping off the scaly bark is time consuming and requires considerable skill since otherwise more harm than good is accomplished. At most, this procedure merely delays the inevitable decrease in yield of the tree to the point where it is more profitable to remove it.

This is the kind of loss a citrus grower no longer need sustain or write off as unavoidable. I have discovered a very simple way of curing or at least remitting the symptoms of psorosis. It is the product of 15 years of my life consecrated to the purpose of curing and controlling the ravages of this desease. The years devoted to attainment were filled with experiments and many disappointments before the final cure was found successful. In these experiments I chose the five acre tract in our orange grove as my laboratory and proving ground. This acreage contained many orange trees afflicted with psorosis in its various stages and of several forms. I decided to begin where other researchers left off. I had the necessary equipment plus a list of treatments which did not work. Today the trees in this proving ground are living, thriving exhibits to testify the effectiveness of my method.

My tests indicate that remission of psorosis in any of its forms can be achieved by the application of dilute iodine dispersion directly to the affected parts of the tree. My preferred treatment for psorosis is extremely simple and involves merely the application of ordinary tincture of iodine, diluted with water in the range of from about 1:10 to 1:16, directly to the affected area. I have found from experience that it is only necessary to apply the iodine solution to the scaly bark itself although no harm is done if some of the iodine reaches unaffected parts of the tree provided that the solution is sufficiently weak and is applied lightly so it does not injure the inner bark. Any convenient method of application can be used, such as a paint brush, a synthetic sponge on a stick or spraying. The outer surface of the scaly bark should be thoroughly impregnated but special care should be taken that the iodine does not reach or injure the cambium layer of the tree. Directions for correct application might be worded: "Apply lightly; do not sop; do not go over the same area twice." The scaly bark should not be scraped or otherwise removed before or after the treatment. The cost of the treatment is only about 10 to 20 cents per tree whereas the cost of scraping off the scaly bark, which effects no cure, is $1.00 or more per tree.

In most of my tests I have used an iodine preparation said to be "Tincture of Iodine N. F. 7%" and satisfactory results have been obtained by diluting one part of this with from 10 to 16 parts of water. This would provide an iodine concentration ranging from about 0.4 to 0.7% by weight. Tincture of iodine is sold in a "mild" preparation, which contains per 100 ml. from 1.8 to 2.2 g. iodine and from 2.1 to 2.6 g. NaI dissolved in alcohol of from about 43 to 50% by volume. "Strong" tincture of iodine contains from 16 to 17 g. iodine and 2 to 4 g. KI dissolved in 100 ml. alcohol of from about 60 to 65% by volume. These preparations can be used, of course, if diluted to the proper degree.

While my tests are not conclusive as to the exact range of operative concentrations which can be employed in treating psorosis, they indicate that the iodine when fully dissolved should have a concentration within the range of from about 0.1 to 1% by weight. This iodine can be dissolved in any non-toxic organic solvent for iodine, such as dilute ethyl alcohol, ether, ethylene glycol, glycerine or the like or, if it is desired to employ water as the sole solvent, it is possible to add an alkali metal or a soluble alkaline earth metal iodide to increase the solubility of the iodine. Unfortunately iodine is soluble only to about 0.04% in cold water and this is rather dilute for the treatment of scaly bark. But it is possible to prepare suitable aqueous emulsions of iodine in either organic or aqueous vehicles making use of any non-toxic suspending agent capable of holding the iodine in suspension. Examples of these agents are starch, gelatine, pectin, carboxy methyl cellulose, sodium silicate, sodium alginate and any of the synthetic surface-active emulsifying agents, such as sodium naphthenic sulfonate, which are non-toxic and non-reactive with iodine. When the iodine preparation is used in the form of an emulsion it can be used in concentrations up to about 3% by weight or slightly more without damage to the trees, provided that the quantity of dissolved iodine in the preparation does not exceed about 1%.

Usually a single application of my iodine solution is sufficient to eliminate the symptoms of psorosis. With the more dilute solutions and in the case of badly infected trees, two treatments can be administered six months apart at the time of growing periods which are spring and fall. These will eliminate disease symptoms and restore the trees to normal producing capacity. In case several treatments are used, these should be spaced apart at least from about 2 to 4 weeks.

In all cases wherein I have applied an iodine solution containing from 0.4 to 0.7 per cent of iodine a marked improvement has been noticeable after a single application within 3 to 4 weeks and in some cases even within a period of only 9 days. Improvement is indicated by new growth springing from bare branches and by the scaly bark starting to shed. Eventually the scaly bark sheds completely and new smooth bark takes its place. This may take 3 months or more, but, to date, I have had no cases where this improvement has failed to take place, even in the case of trees previously marked "take out" owing to the ravages of psorosis. The new bark shows no scales and exhibits no trace of having been diseased.

In one specific example, I employed a 7% tincture of iodine solution, diluting this with water at the rate of 1 tablespoonful to 16 tablespoonfuls of water. After brushing off the dust and loose bark I then applied this to the scaly bark of an orange tree, which was marked "take out" because it was badly infected with psorosis, using a paint brush as applicator. The quantity applied was sufficient to penetrate the scaly bark but not the inner bark. Within a few weeks new growth appeared on the limbs affected with psorosis and several months later the scaly bark had disappeared, smooth bark taking its place without any outward signs of psorosis. An examination conducted a year later showed no sign of psorosis. The following season the tree produced a yield of oranges close to the average of other trees in the vicinity which had not been infected with psorosis.

There are other less common diseases called brown rot and mal di gomma. These first affect the lower portion of the trunk and the upper portions of the main roots from which points they spread in all directions. These diseases require a slightly different treatment owing to the difficulty involved in reaching the affected areas of the roots. The treatment which I have found best consists in removing all leaves and other debris from a circular area around the tree trunk having a diameter of about 6 feet. I cultivate the soil within this cleared area and build up a ring of soil about the periphery of the circle forming a well about the tree deep enough to hold at least about 20 gallons of water. I usually first introduce about 10 gallons of water in the well. Then when the soil has absorbed the water the well is flooded with about 20 gallons of dilute iodine solution, this being formed by adding about one gill of tincture of iodine to about 20 gallons of water, resulting in an iodine concentration of about 0.01% by weight. The iodine solution is poured slowly around and on the tree trunk taking care that it directly reaches all affected areas of trunk and roots. This treatment should be repeated in about 15 days. As yet I have found no infected tree requiring a third application of iodine. The trees so treated have been completely rejuvenated and all signs of disease have disappeared. If it is desired to effect a cure with a single application the concentration of iodine in the solution can be increased up to about 0.1% by weight and from about 10 to 20 gallons applied, sufficient thoroughly to saturate the soil around the tree trunk. This is convenient method of applying the dilute iodine solution directly to the affected root area. If it were possible to reach the affected root area without injuring the tree it would be possible to treat these diseases in the manner described for treatment of psorosis, namely by the direct application of an iodine preparation containing from about 0.1 to 1% dissolved iodine. But less damage is done to the tree by the soil-saturating method described. It is more advantageous to apply the more concentrated solution to the tree trunk above the ground while using the more dilute solution to saturate the ground around the trunk and roots but this requires the use of solutions of two different strengths which is a complication.

While I have described what I consider to be the most advantageous embodiments of my process it is evident of course that various modifications can be made in the procedures set out without departing from the purview of this invention. Thus, it is evident from what has already been stated that the iodine in my preparations can be dispersed in the vehicle either in the form of emulsified or dissolved particles. In emulsions the particles of iodine should be of colloidal dimensions so they can be kept in suspension readily and so they will penetrate the affected bark. But whether the iodine is dissolved or emulsified, the preparation must be dilute, that is, the iodine concentration should not be over about 3% as a maximum. The quantity dissolved should not be over about 1% by weight. Of course the more concentrated the iodine, the less need be applied. The amount applied and the concentration of the preparation should be correlated so that the iodine penetrates the affected bark without injuring the inner bark adjacent the cambium layer.

The manner in which my iodine solution is applied to the affected portions of the trees is not important since any feasible method can be used. The solvent used for dissolving the iodine is of secondary importance. This may be a volatile or non-volatile solvent. Non-volatile solvents tend to delay the vaporization of the iodine and hence prolong the treatment to some extent. The iodine seems to unite with or become absorbed by the bark hence little is wasted by vaporization or by washing off with rain. The most important requirement of the solvent is that it be non-toxic to the tree. This excludes the use of most hydrocarbons for example. No solvent which will kill grass should be used. This is a simple test for operativeness. It is possible, of course, to add other chemicals which are compatible (non-reactive) with iodine in solution to my preparations. Chemicals, such as the soluble iodides, which increase the solubility of the iodine are of advantage.

Other modifications of my process which fall within the scope of the following claims will immediately be evident to those skilled in the art.

What I claim is:

1. In the treatment of citrus trees afflicted with psorosis, the process which comprises giving the scaly bark areas of such a tree a direct but light application of an aqueous preparation containing from about 0.1 to 1% of iodine dispersed in a nontoxic aqueous vehicle, the quantity applied being sufficient to penetrate the outer bark of the tree only without reaching the cambium layer of the tree.

2. The process of claim 1 wherein the iodine is dissolved in said aqueous vehicle.

3. The process of claim 1 wherein the aqueous vehicle contains a small concentration of an alkali metal iodide sufficient to cause dissolution of the iodine therein.

4. The process of claim 1 wherein the aqueous vehicle contains a small amount of alcohol sufficient to cause dissolution of the iodine therein.

5. The process of claim 1 wherein the aqueous vehicle contains both an alkali metal iodide and alcohol in proportions and quantities sufficient to cause dissolution of the iodine therein.

6. The process of claim 1 wherein the preparation is tincture of iodine diluted with water in the proportions of from about 1:10 to 1:16.

7. The process of claim 1 wherein the preparation is tincture of iodine diluted to the point at which it contains from about 0.4 to 0.7% iodine.

8. In the treatment of citrus trees afflicted with psorosis, the process which comprises lightly applying to the affected areas of such a tree an aqueous solution of iodine containing from about 0.1 to 1% iodine and sufficient alkali metal iodide to render the iodine soluble, the amount applied being sufficient to penetrate the outer bark without reaching the cambium layer of the tree.

References Cited in the file of this patent

UNITED STATES PATENTS

| 344,056 | Shilton | June 22, 1886 |

FOREIGN PATENTS

| 2,537 | Great Britain | of 1889 |
| 678,635 | France | Jan. 2, 1930 |

OTHER REFERENCES

"Citrus Diseases and Their Control" (Fawcett and Lee). Published by McGraw-Hill (N. Y.), 1926. Pages 158 and 159.